United States Patent [19]

O'Reilly et al.

[11] Patent Number: 4,904,938
[45] Date of Patent: Feb. 27, 1990

[54] METHOD AND APPARATUS FOR TESTING CHARACTERISTICS OF A FLOPPY DISC AND A FLOPPY DISC DRIVE

[75] Inventors: James O'Reilly, Blackrock; Finbar Kavanagh, Bray, both of Ireland

[73] Assignee: Benares Limited, Dublin, Ireland

[21] Appl. No.: 203,968

[22] Filed: Jun. 8, 1988

[30] Foreign Application Priority Data

Jun. 10, 1987 [IE] Ireland ............................... 1533/87

[51] Int. Cl.⁴ .................... G01R 33/12; G11B 27/36; G11B 5/56
[52] U.S. Cl. ..................................... 324/212; 360/31; 360/77.02; 369/53
[58] Field of Search ............... 324/210, 212; 360/25, 360/31, 77.01, 77.02, 77.06; 369/53, 58

[56] References Cited

U.S. PATENT DOCUMENTS

| | | | |
|---|---|---|---|
| 4,499,572 | 2/1985 | Yoshikawa et al. | 369/58 |
| 4,611,249 | 9/1986 | McClure | 360/77.01 |

FOREIGN PATENT DOCUMENTS

| | | |
|---|---|---|
| 0035915 | 9/1981 | European Pat. Off. |
| 0168155 | 1/1986 | European Pat. Off. |
| 0108771 | 6/1985 | Japan ...................................... 324/210 |
| 0038476 | 2/1986 | Japan ...................................... 324/212 |
| 2054240 | 2/1981 | United Kingdom . |

OTHER PUBLICATIONS

Bowen et al, Measuring Gap Length in Magnetic Recording Heads, IBM Tech. Discl. Bull., vol. 20, No. 10, Mar. 1978, pp. 4059, 4060.

*Primary Examiner*—Gerard R. Strecker
*Attorney, Agent, or Firm*—Sughrue, Mion, Zinn, Macpeak & Seas

[57] ABSTRACT

Method and apparatus for determining the alignment of a data track on a magnetic disc, for example a floppy disc and for determining the alignment of a read/write head in disc drive writing apparatus. In the method the radius of the circumferential center line of the track is determined by determining the radius of the peak value of the transverse envelope of the signal on the data track. The peak value is determined by computing the track average amplitude at a number of incremental positions transversely across the data track. The peak value and its radial position is then computed using a parabolic curve fitting technique.

18 Claims, 11 Drawing Sheets

METHOD AND APPARATUS FOR TESTING CHARACTERISTICS OF A FLOPPY DISC AND A FLOPPY DISC DRIVE

FIELD OF THE INVENTION

The present invention relates to a method and apparatus for testing certain characteristics of a magnetic disc, for example, a floppy disc, hereinafter referred to as a magnetic disc, and also to a method and apparatus for testing certain characteristics of disc drive apparatus for such magnetic discs.

BACKGROUND TO THE INVENTION

Where floppy discs are produced with data written thereon in large quantities, or indeed in any reasonable quantities, it is essential that the data should be written on the disc to conform to certain predetermined standards. For example, it is important that each track of data being written on the magnetic disc should be properly aligned on the disc, in other words, that the circumferential central line of each track should be within certain predetermined radial limits. It is also essential that the tracks of data should be written concentrically with the centre of the disc, and should not go beyond certain predetermined limits of eccentricity. Furthermore, it is important that the floppy disc should be driven by the disc drive apparatus at a speed which falls within certain predetermined limits during writing. It is also important that each track should be correctly indexed, in other words, that the beginning of each track of data should commence within certain predetermined limits of an index mark. The modulation and signal amplitude of the written data should also be within certain predetermined limits. Furthermore, it is important that the bits of data should be written in their correct relative position on each track. Each bit is assigned a window and each bit should be written well within its window. The test for this is normally referred to as a window margin test, and the window margin is the part of the window where no bits occur.

This requires that the disc drive which is writing the data should operate to write the data within the relatively tight predetermined limits. Should the disc drive apparatus fail to keep the characteristics within the predetermined limits, it is essential that the particular apparatus should immediately be taken out of production.

Unfortunately, the only known way for checking such disc drives is to take the apparatus out of production and physically check the various components and their relative alignment. For example, the alignment of the read/write head relative to the axis of the disc drive is precision measured and to ensure concentricity the rotational alignment of the disc drive shaft is also measured. The speed of the disc drive shaft is measured to ensure that the rotational speed of the floppy disc is correct during writing, and the relative position of the read/write head to the index window is also determined.

These tests require disassembling a considerable portion of the disc drive apparatus. It has been found in the past that where such apparatus is being reassembled after being tested, and/or after adjustments or corrections have been carried out, certain components may be inadvertently misaligned. This in many cases may not be discovered until a large number of discs had been written, which would ultimately have to be rejected.

There is therefore a need for a method and apparatus for testing certain characteristics of magnetic disc drive apparatus which overcomes the problems of methods and apparatus known heretofore. Indeed, there is also a need for a method and apparatus for testing floppy discs to ensure that certain characteristics of the floppy discs are also within certain predetermined limits.

OBJECTS OF THE INVENTION

One object of the invention is to provide a method which enables certain characteristics of a magnetic disc, for example, a floppy disc to be tested. A particular object of the invention is to enable the track alignment of a data track on a floppy disc to be tested. Another object of the invention is to enable the index to data characteristic of a floppy disc to be tested, the index to data characteristic being the offset between the point at which writing commences on a data track and an index mark on the disc. A further object of the invention is to provide a method for testing the spin speed of the disc at which the data was written. A further object of the invention is to provide a method which enables the amplitude of the data signal written on the disc to be tested. A still further object of the invention is to provide a method which enables the media modulation of the disc to be determined. A still further object of the invention is to provide a method which enables the eccentricity of a data track of a magnetic disc to be determined. A further object of the invention is to provide a method which enables a window margin test to be carried out. Another object of the invention is to provide apparatus which enables the methods for determining the above characteristics to be carried out.

A still further object of the invention is to provide a method and apparatus for determining certain characteristics of disc drive apparatus, and in particular disc drive apparatus for writing on magnetic discs. In particular, an object of the invention is to provide a method and apparatus which enables the above discussed characteristics to be determined in respect of disc drive apparatus.

SUMMARY OF THE INVENTION

According to the invention there is provided a method for testing alignment of a data track written on a magnetic disc, the method comprising the steps of rotating the disc, positioning a reading means at a first known radial position relative to the data track, reading the signal of the track over at least portion of the circumferential length of the track at the first known radial position, and determining the track average amplitude over the read circumferential length at the known radial position, moving the reading means respective incremental distances transverse of the track to a second and subsequent known radial positions, reading the signal of the track at each of the known radial positions and determining the track average amplitude at the said known radial positions, continuing to move the reading means incremental distances transverse of the track until the value of the track average amplitude obtained from a reading is less than the track average amplitude of the reading for the previous position, and determining the radial position of the peak value of the track average amplitude from the readings taken.

Preferably, the radial position of the peak value of the track average amplitude of the data track is determined by curve fitting using a parabolic curve fitting method.

Preferably, the method further comprises testing the index to data value of data written on a magnetic disc, the method comprising the steps of determining the circumferential position of the index position, positioning the reading means to read a data track, determining the circumferential distance from the index position of a signal resembling a write splice on the data track, positioning the reading means to read another track, determining the circumferential distance from the index position of a signal resembling a write splice on that other track, comparing the distances from the index position of the two write splices, and if the distances of the two write splices are within a certain predetermined limit, accepting the write splices as being write splices, and determining the index to data value of one or each write splice by subtracting the distance of one or each write splice from the index position from the distance a correctly positioned write splice would be from the index position. Additionally, the method further comprises testing the spin speed of the disc at which the data was written, the method comprising the steps of reading a data track to obtain the circumferential time width of a pulse signal of known type on the data track, and multiplying the width of the pulse by the rotational speed of the disc and dividing the product by the ideal width.

In another embodiment of the invention, the method comprises the step of testing the average amplitude of the signal on a data track, the method comprising the steps of reading the amplitude of similar type signals over at least portion of the data track, determining the peak value of the amplitude of the said similar type signals, and determining the average amplitude of the signals.

In a further embodiment of the invention, the method comprises the step of testing the eccentricity of a data track on a magnetic disc, the method including the steps of rotating the magnetic disc, positioning the reading means at a first position over the average circumferential centre line of a data track, determining the track average amplitude at the first position, moving the reading means to a second position between the average circumferential centre line and one side edge of the track, and recording the circumferential track amplitude envelope at the second position, moving the reading means to a third position on the other side of the average circumferential centre line a distance similar to the distance of the second position from the average circumferential centre line, and recording the circumferential track amplitude envelope at the third position, subtracting the track amplitude envelope of the third position from that of the second position to get a curve of amplitude modulation due to the eccentricity of the track, determining the maximum and minimum values of modulation from the modulation curve due to eccentricity, and subtracting the minimum value of modulation due to track eccentricity from the maximum value and multiplying the result by the radial distance between the second and third positions, and dividing the result by four times the track average amplitude at the first position.

In a further embodiment of the invention, the method comprises testing the signal modulation of the disc, the method comprising the step of reading a plurality of signals of similar type from a track at the circumferential centre line thereof, computing the track average amplitude at the centre line of the track taking only the said signals of similar type, determining the maximum and minimum amplitude values of the said signals of similar type, subtracting the minimum from the maximum values of amplitude of the signal and dividing the result by twice the track average amplitude.

Further, the invention provides a method for testing certain characteristics of a disc drive apparatus for a magnetic disc, the method comprising the steps of reading a magnetic disc having data written thereon by the disc drive apparatus, and determining the characteristic of the disc drive apparatus by reading the data on the magnetic disc.

Additionally, the invention provides a method for testing the alignment of a writing means in a disc drive apparatus for a magnetic disc, the method comprising the steps of testing the alignment of a data track on the magnetic disc according to the method of the invention, and determining the alignment of the writing means in the disc drive apparatus from the results of the test on the magnetic disc.

Furthermore, the invention provides apparatus for testing certain characteristics of a magnetic disc, the apparatus comprising a receiving means to receive a magnetic disc, drive means to drive the magnetic disc at a predetermined speed within predetermined tolerances, reading means to read data from the magnetic disc, means to step drive the reading means in incremental steps radially across the magnetic disc, and means to measure the distance of each incremental step.

Additionally, the invention provides apparatus for testing alignment of a data track written on a magnetic disc, the apparatus comprising means for rotating the disc, reading means for reading data from the disc, means for moving the reading means radially across the disc and for selectively positioning the reading means at a plurality of radially spaced apart positions on a data track, means for recording each position, means for determining the track average amplitude at each position over at least portion of the length of a track from data read by the reading means, means for determining the radial position of the peak value of the track average amplitude from the values of the track average amplitude and their positions.

In one embodiment of the invention, the means for determining the radial position of the peak value of the track average amplitude from the values of the track average amplitude and their positions comprises means for using a curve fitting technique.

ADVANTAGES OF THE INVENTION

The advantages of the invention are many. In particular, the invention provides a method and apparatus which enables certain characteristics of a magnetic disc to be tested and determined relatively simply and inexpensively. The apparatus according to the invention is similarly relatively inexpensive and not complex. In particular, when the method according to the invention is used for testing the alignment of a data track on magnetic discs, relatively accurate results are obtained. It has also been found that the method according to the invention provides relatively accurate results in determining the index to data offset. A further advantage of the invention is that by virtue of the fact that the spin speed is determined by reading the circumferential width of a signal, relatively accurate results of spin speed can be achieved. By selecting signals of a similar type, a more accurate determination of the track average amplitude is obtained.

The method for determining the eccentricity of a data track on a magnetic disc according to the invention also it has been found produces relatively accurate results. While it has been found that good results are achieved by taking readings on each side of the average centre line of a track at positions approximately one half the head width from the average centre line, it is believed that adequate results could be achieved by taking readings with the read head positioned on each side of the average centre line at positions in the range of 0.10 to 0.80 of the head width.

When the method and apparatus are used for determining the characteristics of a disc drive, the invention provides many advantages. Firstly, it provides a method and apparatus for determining these characteristics without the need for disassembling or indeed even taking the disc drive apparatus out of use. Secondly, it provides relatively accurate results. Thirdly, it provides a relatively inexpensive, simple and uncomplicated method and apparatus for determining characteristics of a disc drive apparatus. Furthermore, the invention enables the characteristics of the disc drive apparatus to be monitored and tested on an on-going basis by merely periodically sampling and testing discs written by the apparatus.

These and other objects and advantages of the invention will be readily apparent from the following description of a preferred embodiment thereof, which is given by way of example only.

DETAILED DESCRIPTION OF THE INVENTION

Figure 1:
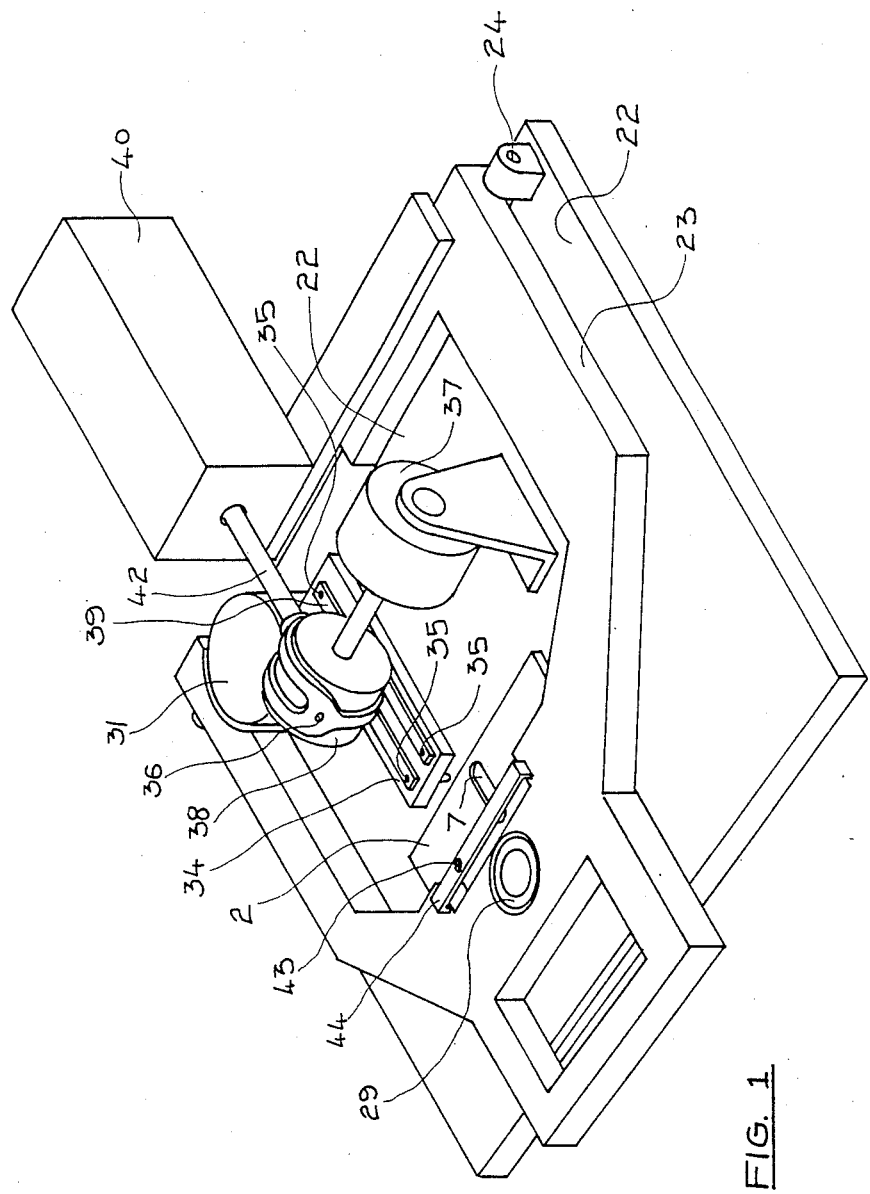
FIG. 1 is a perspective view of portion of apparatus according to the invention.
Figure 2:
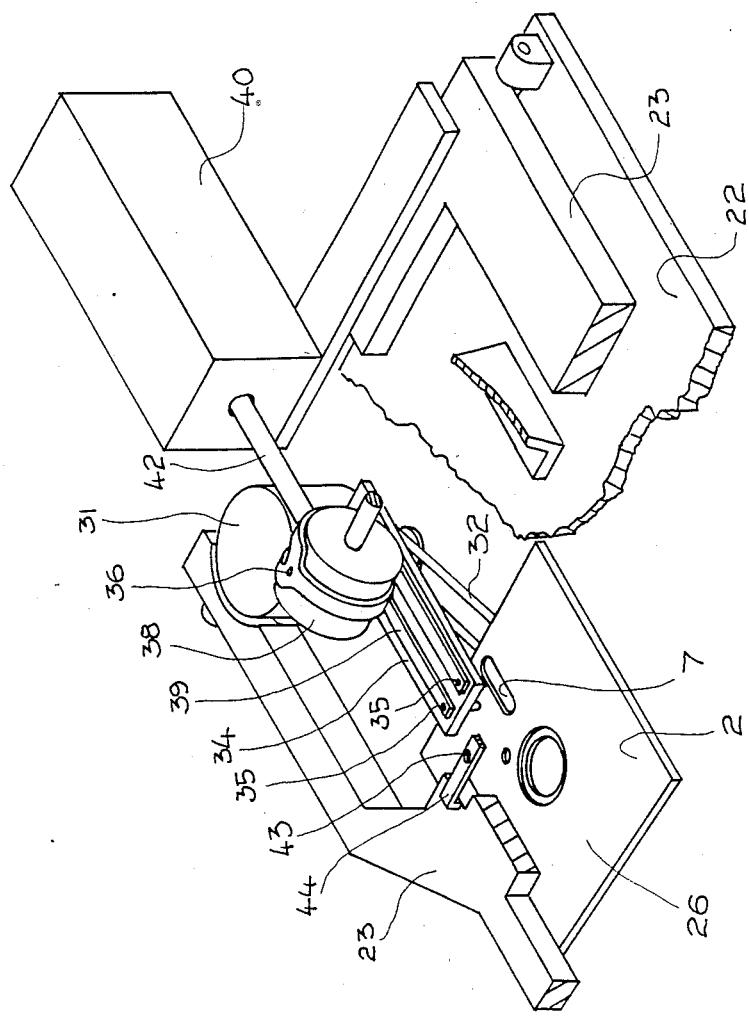
FIG. 2 is a partly cut-away perspective view of the portion of the apparatus of FIG. 1.
Figure 3:
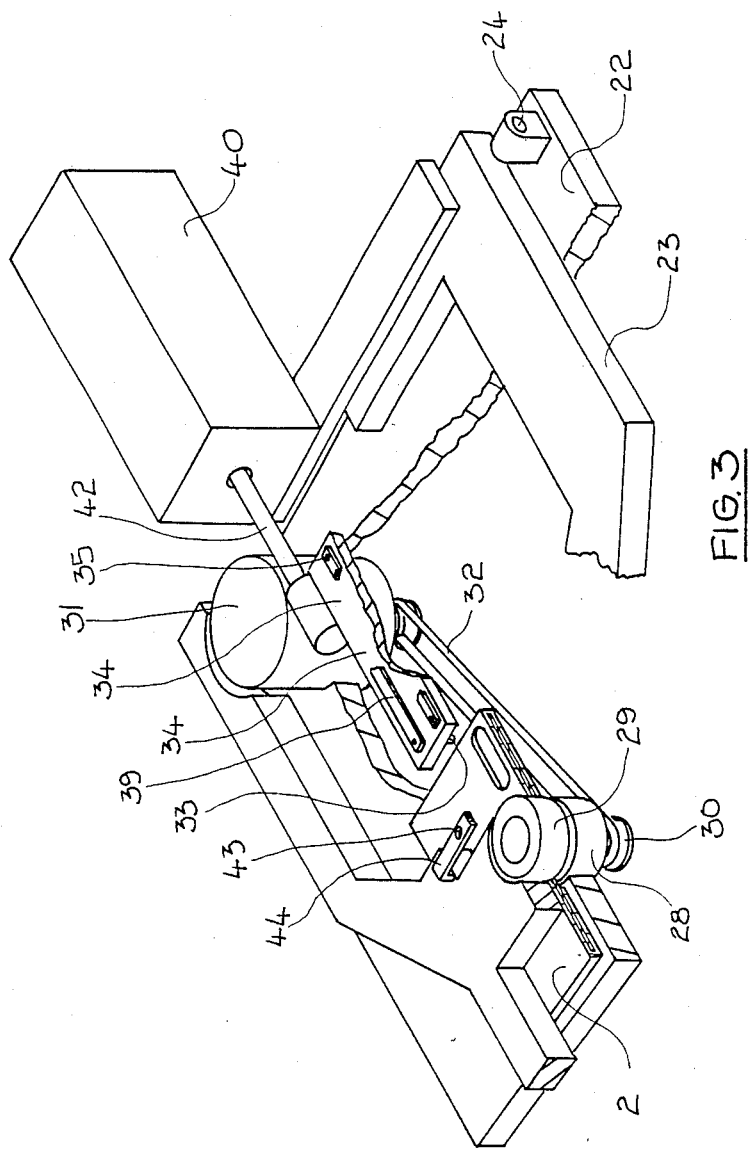
FIG. 3 is another partly cut-away perspective view of the apparatus of FIG. 1.

Referring to the drawings, there is illustrated apparatus according to the invention indicated generally by the reference numeral 1 for carrying out the method of the invention for testing certain characteristics of a magnetic disc, in this case a floppy disc 2 having data written thereon. The apparatus and method are also used for testing certain characteristics of a disc drive apparatus by reading the characteristics from a floppy disc with data written thereon by the disc drive apparatus to be tested. This is described in detail below. By determining the characteristics of the data written on the floppy disc, it has been found that one can determine the characteristics of the disc drive apparatus which wrote the data on the disc. For example, if the data track written on the disc is out of alignment, then the write head of the disc drive apparatus would have been out of alignment when the data was being written. By determining the amount by which the data track on the floppy disc is out of alignment, the misalignment of the write head of the disc drive apparatus can be determined.

In this embodiment of the invention, the apparatus and method is suitable for testing the following characteristics (a) track alignment,
(b) index to data offset,
(c) spin speed,
(d) amplitude,
(e) eccentricity of the data track,
(f) modulation, and
(g) window margin.

For clarity it is intended to describe the apparatus according to the invention first and then the method. However, before describing the apparatus and method, a floppy disc and certain of its characteristics will briefly be described to facilitate understanding of the invention.

Figure 6:
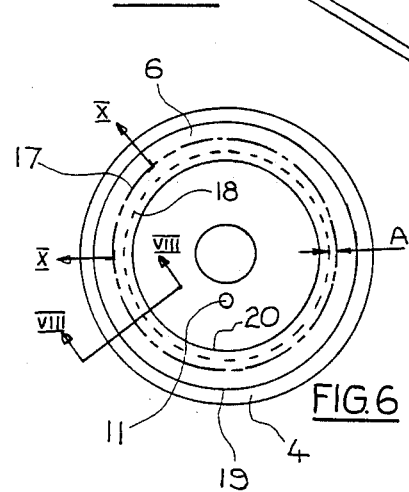
FIG. 6 is a plan view of portion of the floppy disc of FIG. 5.

Referring to FIGS. 5 to 11, various aspects of a floppy disc 2 are illustrated. This is a standard floppy disc and will be well known to those skilled in the art. The floppy disc 2 comprises an envelope 3 within which is rotatably mounted a magnetic media disc 4. Data is written in concentric tracks 6 on the magnetic disc 4 by a write head of suitable disc drive apparatus for subsequent reading. A track 6 considerably enlarged and out of scale is illustrated in FIG. 6 on the disc 4. The outside edge of the track 6 is indicated by the reference numeral 19. This is the edge nearest the outside edge of the disc 4. The inside edge of the track 6 is indicated by the reference numeral 20. A window 7 is provided in the envelope 3 to permit access of the read and/or write head to the disc 4. An opening 9 in the envelope allows a drive shaft to engage the disc 4 for rotation thereof, and an opening 10 in the disc 4 facilitates alignment of the disc 4 on the drive shaft of the disc drive apparatus. An index alignment window 11 is provided in the disc 4 which aligns with holes 12 in the envelope to enable a light beam to pass therethrough for determining the index position at which the first piece of data is to be written on each track. In most cases, two windows 7 are provided in the envelope to permit writing on the front and back of the disc 4.

Figure 8:
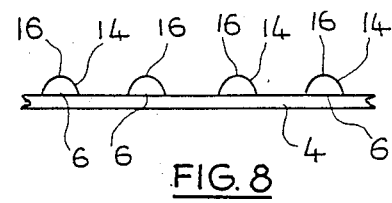
FIG. 8 is a sectional view of portion of the disc of FIG. 6 on the line VIII—VIII of FIG. 6.
Figure 9:
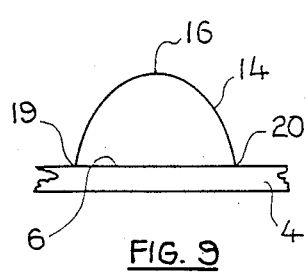
FIG. 9 is an enlarged view of portion of the sectional view of FIG. 8.
Figure 10:
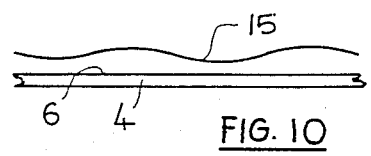
FIG. 10 is a sectional view of the disc of FIG. 6 on the line X—X of FIG. 6, FIG. 11(a) to (d) are graphs of signals from a track eccentrically written on a floppy disc, FIGS. 12(a) and (b) is a flow chart of a sub-routine of software of the apparatus.

FIG. 8 illustrates a radial section on the lines VIII—VIII through portion of the disc 4, and a transverse section of the amplitude envelope of a signal of data written on the tracks 6 is illustrated by the curves 14. FIG. 9 illustrates an enlarged view of one of the curves 14 of the amplitude taken transversely across a track 6. FIG. 10 illustrates a circumferential section of portion of the track on the line X—X and the curve 15 illustrates the envelope of the peak amplitude value circumferentially around the track. In other words, the peak value is obtained at the centre of the track, namely point 16 on the curve 14. A circumferential centre line 17 of the track 6 is illustrated on the disc 4 in FIG. 6. This track 6 is out of alignment. The centre line illustrated by the reference numeral 18 is the centre line of the correct position of the track 6 and accordingly, it can be seen that the out of alignment of the track 6 is the distance plus A.

Figure 7:
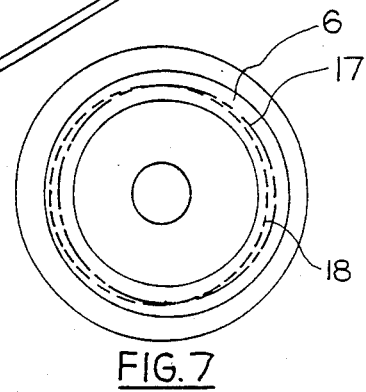
FIG. 7 is another plan view of the portion of FIG. 6.
Figure 11:
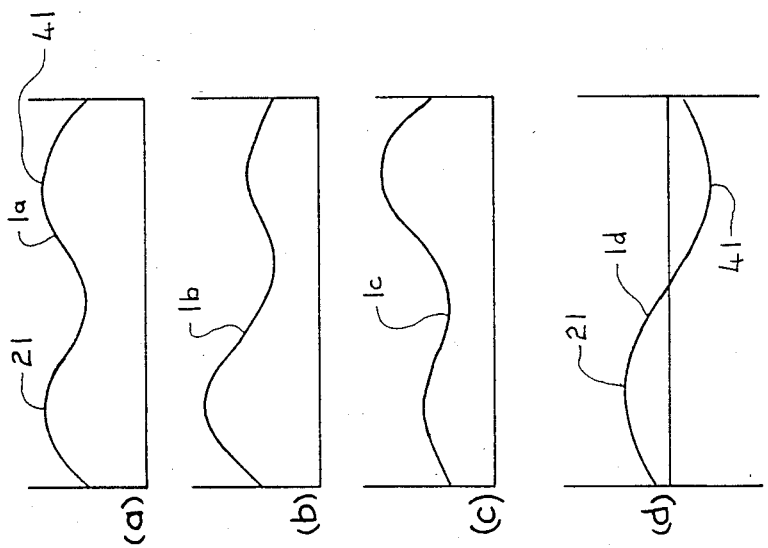

FIG. 7 illustrates the disc 4 with an eccentrically written track 6. The centre line 17 is the centre line of the track 6 and the centre line 18 is the centre line of a correctly written track. FIG. 11 illustrates the amplitude envelope which would be read from this track when the disc 4 is mounted in a concentrically driven disc drive.

Referring now to FIGS. 1 to 4 the apparatus 1 according to the invention will now be described. The apparatus 1 comprises a disc drive unit which comprises a base member 22 pivotally supporting a framework 23 on pivot shafts 24. A floppy disc receiving area 26 is provided between the framework 23 and the base 22. The floppy disc 2 is illustrated in position in the receiving area 26. A drive to drive the floppy disc 2 in the disc receiving area 26 is provided by a pair of rotatable members 28 and 29 rotatable respectively in the base 22 and framework 23. When the framework 23 is pivoted downwardly towards the base 22 by a solenoid (not shown), the rotatable members 28 and 29 clamp the disc 4 between each other. This is similar to conventional floppy disc drive apparatus. A spindle 30 driven by a drive motor 31 through a belt 32 drives the rotatable member 28. A reading means, in this case a read/write head 33 is mounted on a read head carrier 34 and reads data from the floppy disc 2, for convenience the read/write head is referred to as a read head. For clarity the read head 33 is illustrated spaced apart from the floppy disc 2, however in practice the head 33 would be adjacent the magnetic disc 4 of the floppy disc 2 as in conventional disc drive apparatus. The read head carrier 34 is slidable on high precision tracks (not shown) to scan from one end of the window 7 to the other. The carrier 34 is driven by a stepping motor 37, in this case a motor capable of 25,000 incremental steps per revolution supplied by Compumotor, Inc. A drive belt 39 around a pulley 38 driven by the motor 37 is connected to the carrier 34 for driving the carrier by rivets 35. A rivet 36 secures the belt 39 to the pulley 38. Means for determining the radial position of the read head 33 relative to the floppy disc 2 is provided by a photoelectric position transducer, in this case, a linear transducer 40 provided by a diadur grating sold by Heidenhain AG. A member 42 carrying the defraction grating within the transducer 40 extends from the read head carrier 34. The transducer 40 can accurately determine the position of the read head 33 to within one micrometer. Alternatively, a rotary transducer could be used if desired.

Means to detect the index window 11 in the floppy disc 2 is provided by a photocell 43 mounted on a bracket 44 on the framework 23. A light source (not shown) beneath the floppy disc receiving area 26 is provided in the base 2. The position of the light source and photocell 43 are adjustable.

The components of the apparatus 1 are assembled with high precision and are retained in position with particularly close tolerances. The base 2 is mounted in a housing (not shown) which comprises a hopper (also not shown) to store discs to be fed into the floppy disc receiving area 26 by an automatic feed (also not shown). An ejection mechanism (also not shown) is provided to eject tested floppy discs from the receiving area 26 into a storage bin (not shown) within the housing. Such arrangements of storing and feeding of floppy discs will be well known to those skilled in the art.

Figure 4:
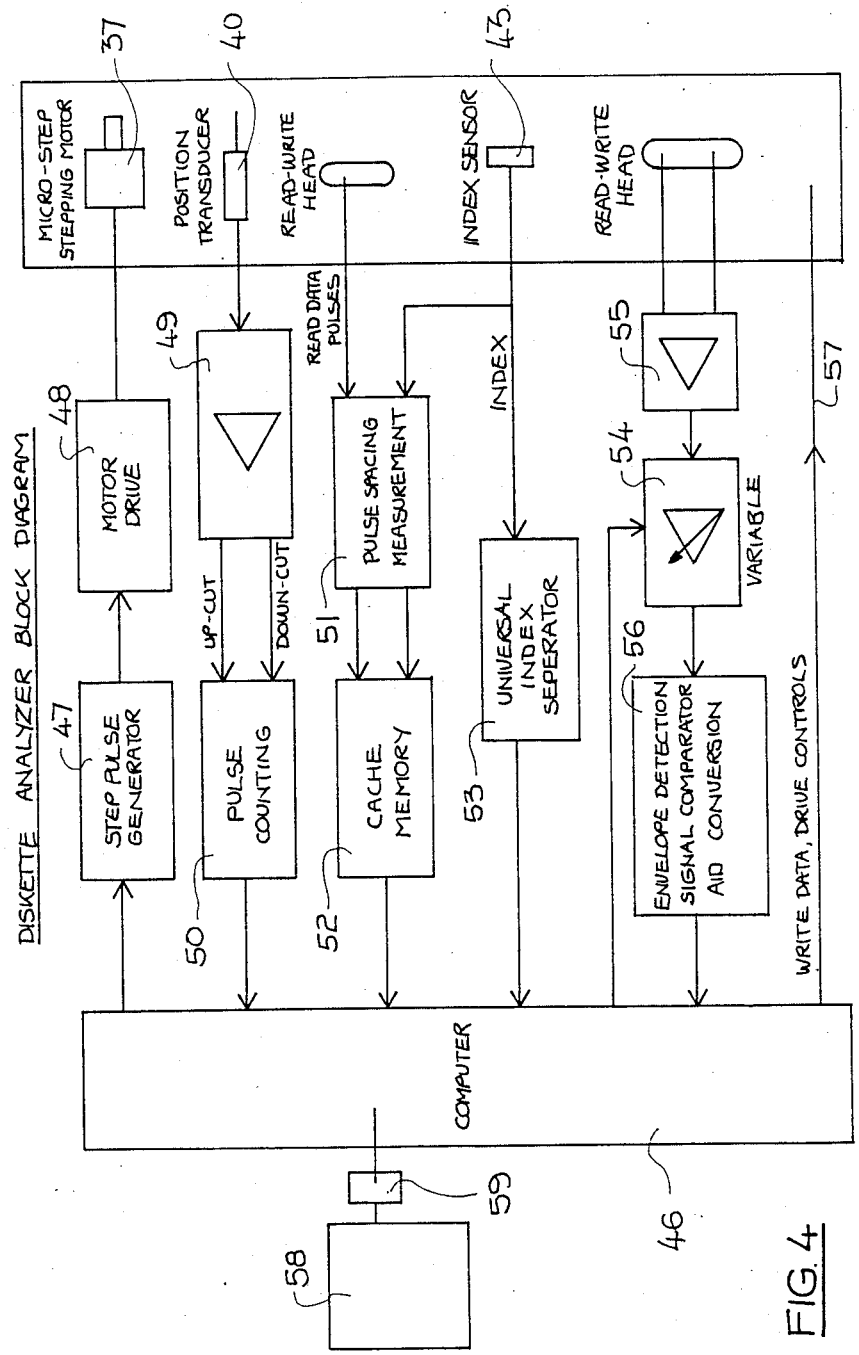
FIG. 4 is a schematic representation of the apparatus of FIG. 1.
Figure 5:
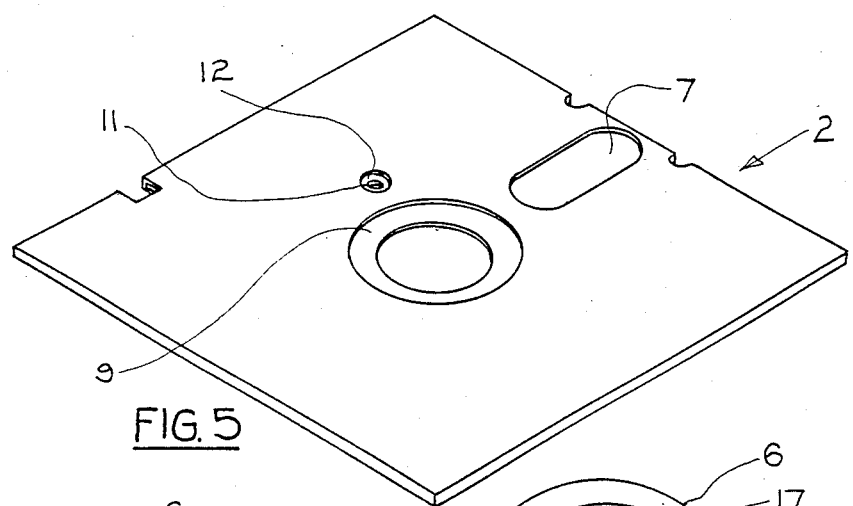
FIG. 5 is a perspective view of a floppy disc which could be tested by the apparatus of FIG. 1.

The read head 33, the transducer 40, the stepping motor 37 and the photocell 43 are connected and controlled by hardware and software. The hardware is schematically illustrated in FIG. 4 and comprises a computer 46 which controls the operation of the apparatus 1. In response to an appropriate signal from the computer 46, a step pulse generator 47 generates a pulse or pulses for delivery to a motor drive 48 to step the motor 37 on one or more increments. The position of the read head 33 recorded by the transducer 40 is fed to an amplifier 49, which delivers an upcount or downcount as the case may be to a pulse counter 50 which indicates to the computer 46 the distance travelled and position of the read head 33. Data read by the read head 33 from the floppy disc 2 is fed into a means 51 for measuring the pulse spacing. This data is in turn fed into a cache memory 52 for delivery to the computer 46. Data from the photocell 43 is fed into the means for measuring the pulse spacing 5 and a universal index separator 53. Data from the read/write head 33 is fed to a variable gain amplifier 54 through an amplifier 55 and then into an analog to digital convertor 56 where it is fed to the computer 46. Write data and drive control signals are fed from the computer through the line 57 to the read head 33 and a suitable motor drive for the drive motor 31. A visual display 58 driven through a suitable driver 59 by the computer 46 displays the computed characteristics.

The method according to the invention for determining the various characteristics will now be described in conjunction with flow charts illustrated in FIGS. 12 and 13 of some of the software of the apparatus 1.

Prior to testing a floppy disc, the apparatus 1 is initially calibrated using suitable calibration discs. In this case, a gold standard alignment disc by Dymek Corporation is used for setting up track alignment and index to data calibration. A gold standard reference media disc of Physikalisch-Technische Bundesanstalt is used for amplitude calibration. Needless to say, any other suitable discs could be used. Further, it will, of course, be appreciated that different standard discs will have to be used for calibrating the apparatus for different writing formats and for different size discs. The relevant data is read from the calibration disc and stored in the computer. The data read and stored from the calibration discs in this particular embodiment of the invention is as follows. The offset of the read head 33 from the correct position to coincide precisely with the correct positions of certain tracks on the disc is recorded, the offset of the read head 33 from the correct index to data position is also recorded. This is determined from the alignment disc. The level of signal which should be received by the read head 33 with 100% amplitude is determined from the amplitude reference discs. Such calibration techniques will be well known to those skilled in the art.

After calibration, the discs to be tested are then sequentially entered in the receiving area 6 of the apparatus 1. The following tests are then carried out.
(a) track alignment,
(b) index to data offset,
(c) spin speed,
(d) amplitude,
(e) eccentricity of the data track,
(f) modulation, and
(g) window margin.

Each of these tests will now be dealt with under a separate heading below. Prior to carrying out the tests, the read head 33 initially tests for gross error. In other words, it tests to ascertain if the data tracks are badly out of alignment, for example, if the data tracks are displaced by a full track position or more. The read head also searches for and collects information on the information track, if such a track is provided, and this information is logged, so that the disc can be identified. Normally the information track is the inside track of a floppy disc. The read head also checks the format type in which the data is provided on the disc from the information track.

TRACK ALIGNMENT TEST

To ascertain the track alignment, the circumferential centre line of a data track on the floppy disc is determined by determining the radial distance at which the peak value of the transverse envelope of the amplitude of the data track occurs. In other words, the radial distance at which the peak 16 of the curve 14 of the appropriate track occurs is recorded. This gives the radius of the circumferential centre line 17 of the data track. This radius is compared with the correct radius at which the peak should have occurred if the track was properly aligned. The value of the correct radius is subtracted from the radius of the circumferential and centre line, thereby giving the value of the misalignment. A positive value indicates that the radius of the track is too great, while a negative value indicates that the radius is too small. The misalignment value is displayed on the visual display screen 58. Alternatively, if desired, the actual radius of the circumferential centre line of the data track may also or alternatively be displayed.

Figure 12A:
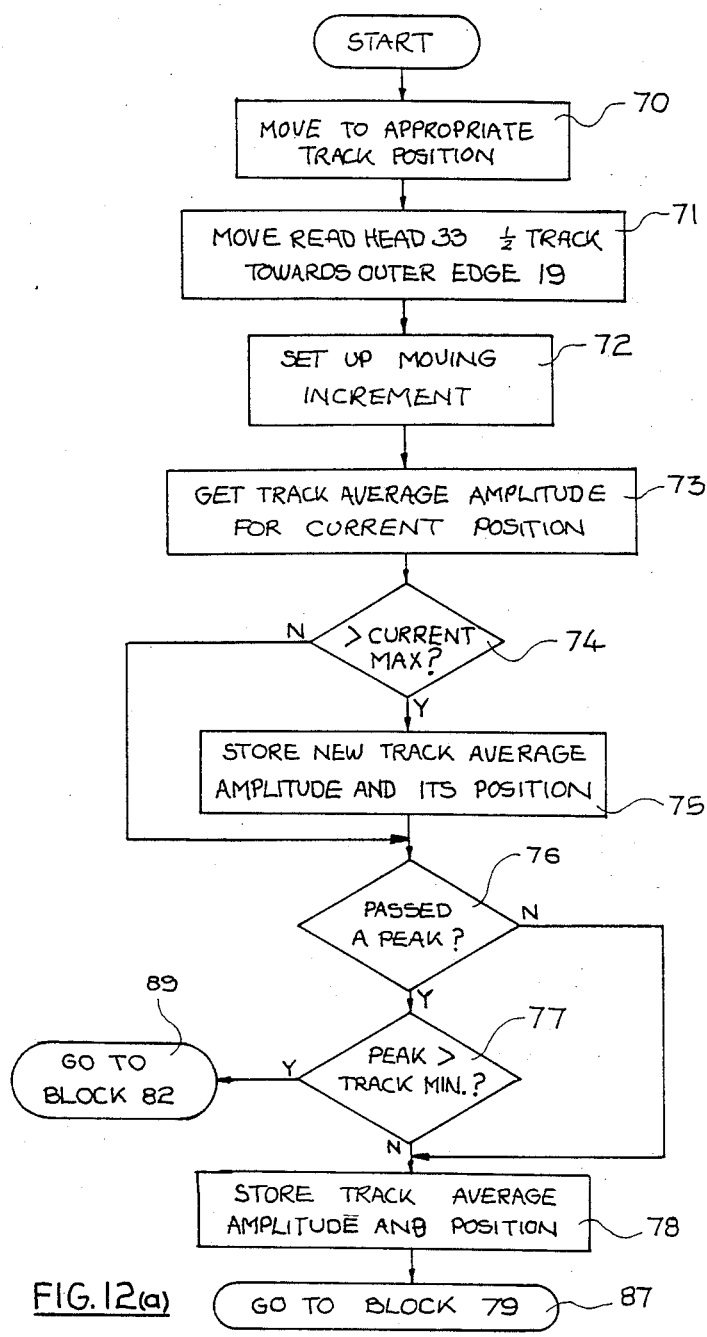

The flow chart of the sub-routine which carries out this test is illustrated in FIGS. 12(a) and (b). With the disc 4 of the floppy disc 2 spinning, the sub-routine of FIG. 12 commences. Block 70 of the flow chart moves the read head 33 to the approximate position of the track the alignment of which is to be tested. Unless a specific track is called up, the read head is moved to track zero, namely the outside track of the disc. Block 71 moves the read head 33 a half track distance towards the outer edge 19 of the track. Block 72 sets up the value of the incremental distance by which the read head 33 is to be moved. In this case, the read head is to be moved 1/16 of the track width in each incremental move. Block 73 gets the track average amplitude for the current position of the read head 33. The track average amplitude is computed from data fed through the analog to digital convertor 56 to the computer 46 and is based on amplitude values of the data signal received from the track over one revolution of the disc using standard procedures set down by the American National Standards Institute (ANSI) specification. Block 74 compares the current track average amplitude with previous readings. Provided each reading is greater than the current maximum, the programme moves on to block 75 where the new maximum track average amplitude is stored, as well as its radial position. The programme then moves on to block 76. Block 76 checks if the read head 33 has passed the peak of the amplitude, namely the peak 16 of the curve 14 of FIG. 9. In other words is the current value less than previous values. Provided the read head 33 has not passed a peak, the programme moves to block 78, where the read track average amplitude and its radial position are stored. The programme then moves to block 79, which causes the motor drive 48 to increment the drive motor 37 the appropriate number of increments to move the read head 33 one increment, namely 1/16 of a track width inwardly into the track. Provided the read head 33 has not been moved inwardly a half track distance, the programme then goes to block 88 which returns it to block 73.

This process continues until block 74 detects that the reading just taken is not greater than the current maximum, at which stage the programme moves directly to block 76. Block 74 detecting that the reading is not greater than the current maximum value, indicates that the peak 16 of the transverse envelope of the data on the track has been reached. When block 76 detects that the read head 33 has passed the peak 16, the programme then goes to block 77. This would occur when the reading just taken by the head 33 is less than the previous reading. Block 77 checks that the peak is greater than the track minimum and when this condition is reached, the programme goes to block 82. Block 82 moves the read head 33 one further increment inwardly in the track towards the inner edge 20 and the track average amplitude at this position is recorded. The programme then moves to block 83, which checks if the read value of the track average amplitude is less than 90% of the peak value of the track average amplitude. The programme cycles between block 82 and 83 until the read value of track average amplitude is less than 90% of the peak value. Once a position is reached where the track average amplitude is less than 90% of the maximum track average amplitude value, the programme moves to block 84, which stores the value of the track average amplitude and the position at which that was obtained. The programme then moves to block 85 which moves the read head 33 one further increment towards the inner edge 20 of the track and records the track average amplitude value and its position at that position and stores these values. The programme then moves to block 86, which calculates the centre of the track using a curve fitting technique as follows.

It is assumed that the transverse envelope of the signal of the data track is a parabola. Thus, the equation of the transverse envelope can be written as follows $$Y = AX^2 + BX + C$$

where Y is the amplitude and X is a radial distance. A, B and C are constants.

This equation can be solved for A, B and C using Cramers Rule by taking values of X and Y at three known points of the envelope recorded by the head 33. The known values of X and Y at the three known points are substituted for X and Y. One point is taken on each side of the peak 16 and one other point. Having solved the equation using Cramers Rule to obtain the values of A, B and C, the equation is then differentiated once and equated to zero to obtain the X and Y co-ordinates of the maximum point. This thus gives the maximum track average amplitude and its radial position on the disc, in other words the radial position of the centre line of the track. The radial position of the centre line of a correctly positioned track is subtracted from the computed value, and the misalignment if any is displayed.

It has been found that when substituting values to solve for A, B and C in the quadratic equation, it is better to substitute values for X and Y where the value of the transverse average amplitude is less than 95% of the maximum track average amplitude but greater than 50%. It is for this reason that the programme cycles in blocks 82 and 83 until a track average amplitude of 90% of the maximum value is found on the inside of the track.

Figure 12B:
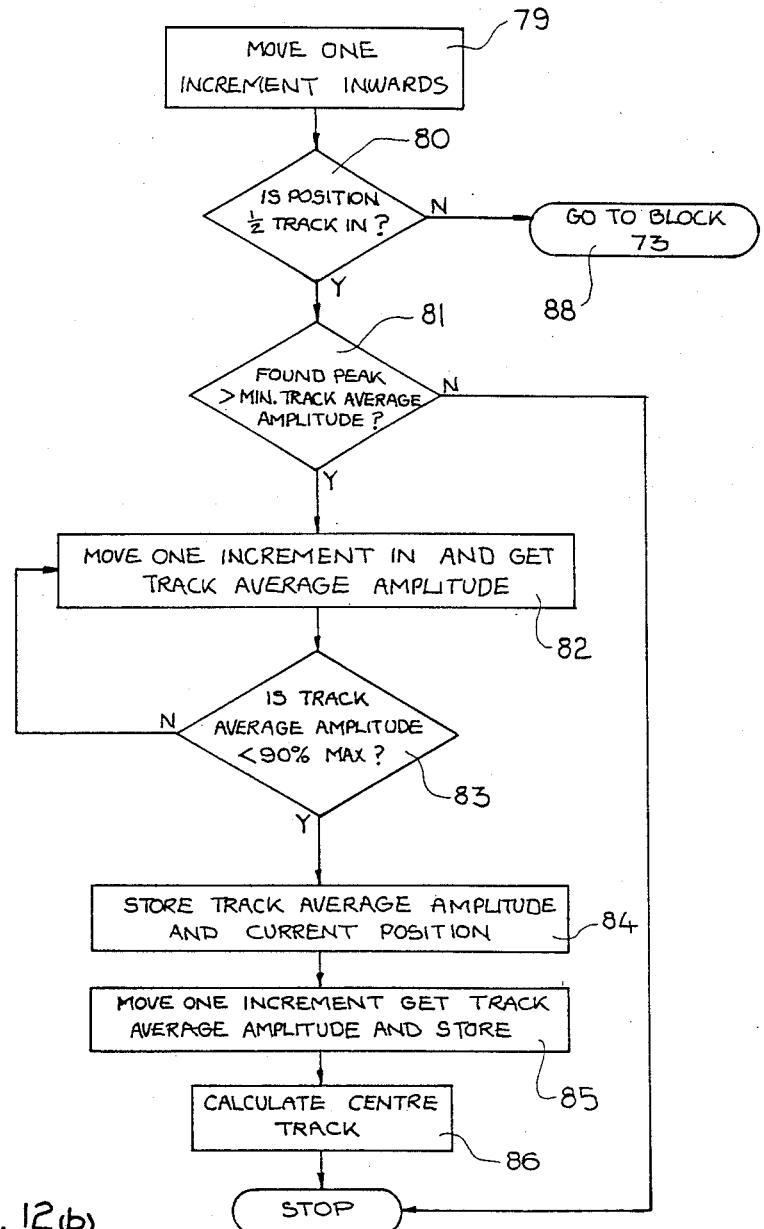

Returning now to block 80 in the flow chart of FIG. 12 if block 80 finds that the head 33 has moved one half track inwardly, the programme then moves on to block 81 to check if the programme has found a peak greater than the minimum track average amplitude. If so, the programme then moves on to block 82 and continues as already described. Otherwise, the programme stops.

This method for determining the radial position of the centre line of the track may also be used in cases where the transverse envelope of the data signal on a track is not a complete parabola, for example, where the top portion of the transverse envelope is flattened. In which case, it has been found that by assuming that the transverse envelope is a parabola, accurate results for the radial position of the track centre line are achieved. The method and curve fitting technique used in the case where the track envelope is not a complete parabola is similar to that already described.

INDEX TO DATA VALUE

Figure 14:
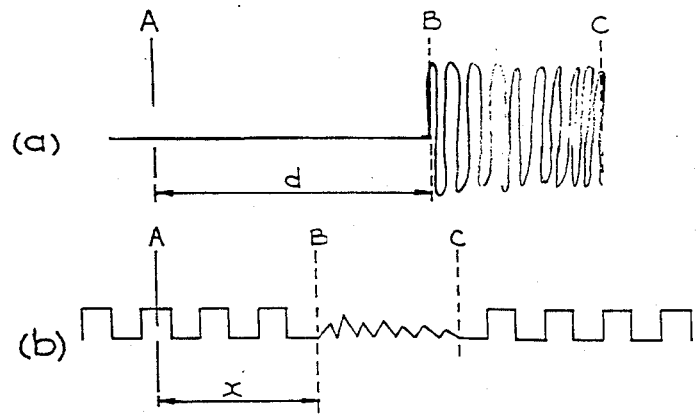

FIGS. 14(a) and (B) illustrate data signals read from a track around the index position. Point A is the point at which the photocell 43 of the apparatus 1 senses light from the light source passing through the index opening 11 of the disc 2, when the opening 11 is aligned with the light source and photocell 43. B is the position at which the write splice commences, in other words, it is the end of the data on the track. C is the end of the write splice, in other words, the point at which data on the track commences. Write splices will be well known to those skilled in the art. FIG. 14(a) illustrates a signal which is received from a standard reference disc, which is used for calibrating the apparatus 1 for the index to data test. The signal from A to B is at a continuous level. At B a burst of pulses is provided to indicate the position where a correctly positioned write splice should occur. The distance from the index position A to the leading edge of the burst of pulses at B is referred to as distance d. FIG. 14(b) illustrates the position of a write splice relative to the index A of a disc in which the write splice occurs too soon. The beginning of the write splice B is indicated as the distance x from the index A. Thus, the index to data value of the disc of FIG. 14(b) is d-x. A correctly positioned write splice would give an index to data value of zero. Where the index to data value is positive the write splice occurred too soon while a negative index to data value indicates that the write splice occurred too late.

Figure 13A:
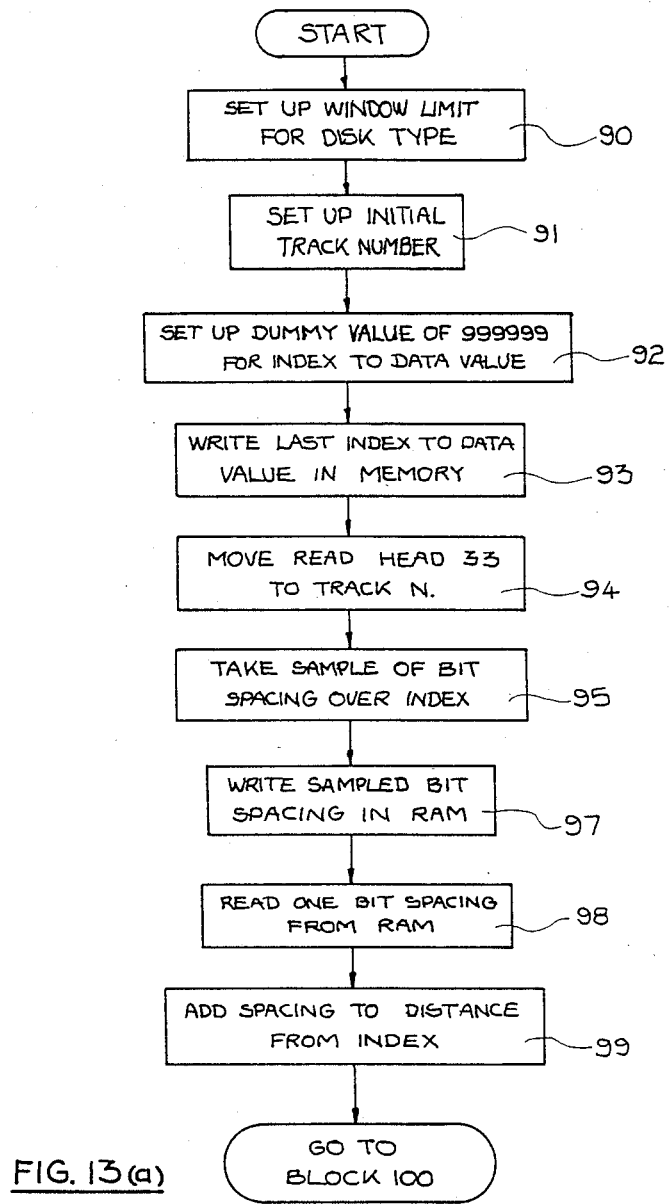
FIGS. 13(a) to (c) is a flow chart of another sub-routine of software of the apparatus of FIG. 1, FIGS. 14(a) and (b) are graphical representations of signals written on a floppy disc, and FIGS. 15(a) and (b) are graphical representations of signals of a floppy disc.
Figure 13B:
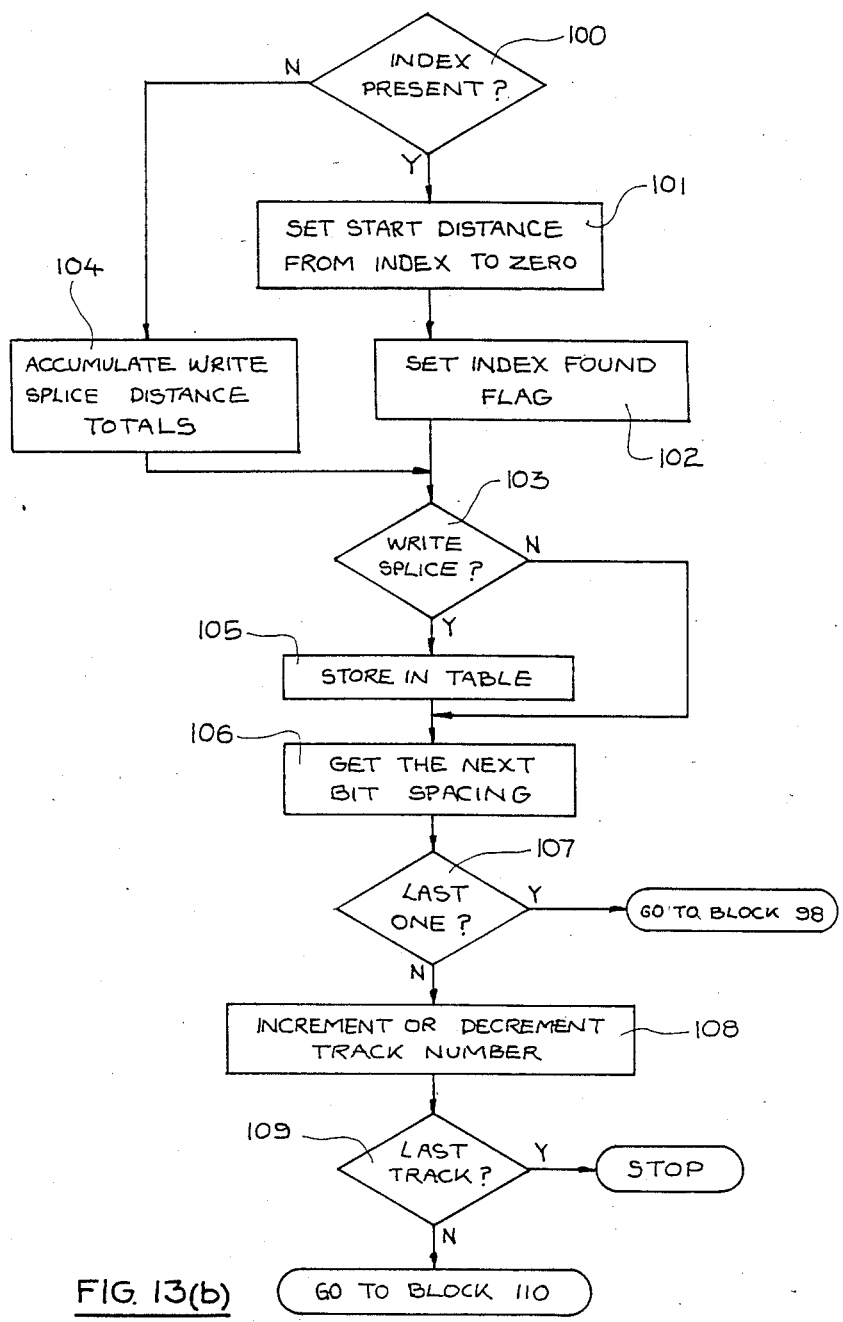
Figure 13C:
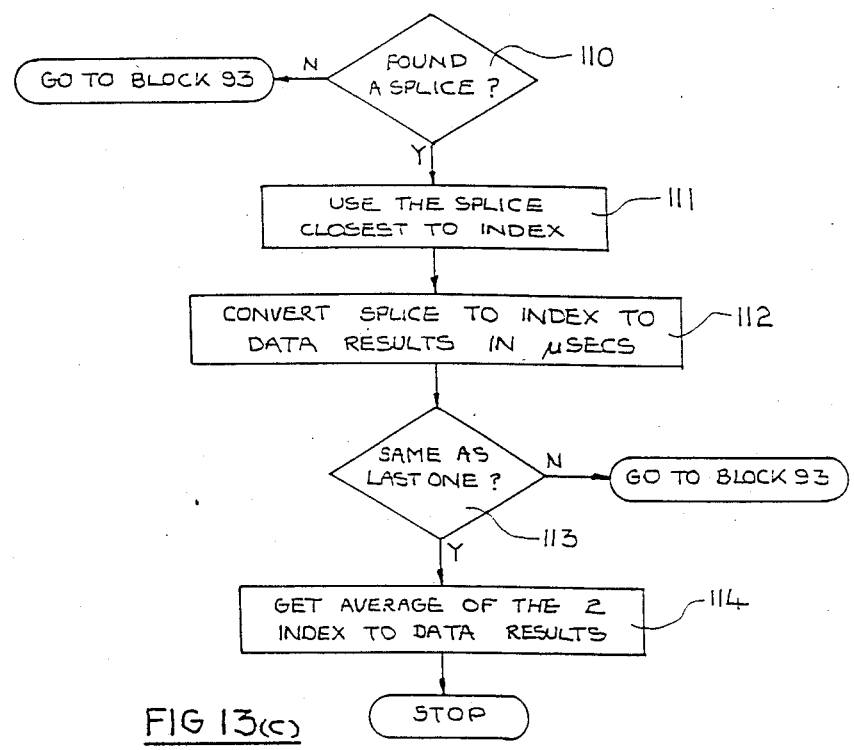

FIGS. 13(a) to (c) illustrate a flowchart of software used in the apparatus 1 for determining the index to data value. Before describing the flowchart in detail the method used will first be briefly outlined. The head 33 is moved to the outer track of the disc and searches for a write splice on the outer track. If a write splice is found its position is recorded. The read head 33 is then moved to the next adjacent track and again searches for a write splice. If a write splice is found on the second track its position is compared with the position on the write splice in the first track. If the two are within twenty micro seconds of each other, then this confirms that both write splices are actually write splices. The average position of the two write splices are calculated to give the distance x in time, namely, in micro seconds. This value of x is then deducted from the value d which will have been obtained from the reference disc during calibration and the difference between the value d and x, namely, the index to data value is displayed. The value of the distance d is also given in micro seconds of time.

Should a write splice not be found on the second track the head 33 is moved onto the third track and so on until another write splice is found. Should a write splice not be found on the first track similarly the head is moved to the second track and so on until two write splices are found within twenty micro seconds of each other. By virtue of the fact that a write splice is not confirmed until two write splices are found on separate tracks within twenty seconds of each other insures that a spurious result will not be provided which could result from a misreading of a write splice.

Referring now to the flowcharts of FIGS. 13(a) to (c) block 90 sets up the window limit for the disc type. The window limit is the distance of track on each side of the index point A over which the read head searches to find a write splice. This window limit varies depending on the type of disc and write apparatus being tested. A typical window limit would be 20,000 micro seconds of time on each side of the index point A. Block 91 selects the first track to be tested. Unless a specific track has been selected block 91 moves the head 33 to track O. Block 92 selects a dummy value of 999,999 for the index to data value. This ensures that there will be no danger of the reading taken in respect of the first track tested being confirmed as a write splice.

Block 93 writes the last index to data value into the memory as being the current last value. Where the programme is testing the first track the value read into memory is the dummy value 999,999. In all other cases it is the index to data value from the previous test. Block 94 moves the read head 33 to the track selected by block 91. Block 95 takes a sample of bit spacing over the index commencing at the beginning of the window limit. Block 97 writes the sampled bit spacings in a RAM of the apparatus 1. Block 98 reads one sampled bit spacings from the RAM stored by block 97 taking the first bit stored first. Block 99 adds the bit spacing to the distance from the index A. Block 100 checks if the index point A has been located. If it has block 100 sets the distance from index to 0 and block 102 sets an index found flag and moves the programme onto block 103. If the index point A has not been found block 100 sends the programme to block 104 which accumulates the distance from the write splice by adding each one bit space read from RAM by block 98. The programme is then moved on to block 103. Block 103 checks if a write splice has been found in the track under test. If a write splice has been found block 105 stores its position in a table and the programme goes to block 106. If a write splice is not found by block 103 the programme is moved on to block 106. Block 106 gets the next bit spacing from the sampled bit spacings in RAM written by block 97. Block 107 checks if the bit selected is the last one within the window limit. If it is the programme moves to block 107. If it is not the last one the programme goes to block 98 which reads the next one bit spacing from RAM.

Block 108 increments or decrements the track number to select the next track to be tested. In general unless pre-selected block 108 increments the track number by one. Block 109 checks if the last track has been tested. If so the programme stops. If not the programme moves to block 110 and checks of a write splice has been found on the last track. If a write splice was not found the programme returns to block 93. If a write splice was found the splice closest to the index is selected as being the splice for that track. This would only arise if more than one splice was found in the window limit for a track. Block 112 converts the splice to an index to data result. This is carried out by subtracting the distance x of the found write splice from the index point A from the reference value d. Block 113 checks if the index to data result is the same as the last one or within twenty micro seconds of the last result. If not the programme returns to block 93. If the index data result is within twenty micro seconds of the last result then the programme moves to block 114 which gets the average of the two index to data values. This value is then displayed as being the index to data value for the disc.

SPIN SPEED

To test the spin speed at which the data was recorded onto the floppy disc 2, the read head 33 samples tracks 0, 1 and 2 along their circumferential centre line. On each track, the read head 33 searches for a continuous burst of 2F signal. It will look for a 2F burst with at least twelve pulses of 2F. In general, bursts of 2F signal are normally written onto a floppy disc to facilitate synchronisation of the read circuitry. On locating the twelve pulse 2F burst, the read head takes the four centre pulses of the twelve pulse burst. The circumferential length of each of the centre four pulses is measured and the average pulse width of the four pulses is computed. The speed at which the data was recorded is obtained from the following formula.

$$\text{Speed} = \frac{X}{(\text{Ideal value of } X)} \cdot \frac{(\text{speed of apparatus 1})}{(\text{revolutions per minute})}$$

where X=the average pulse length in time of the 2F signal.

The spin speed is in revolutions per minute, and the ideal value of X is the length the pulses should be. This is value is defined for different data formats on discs.

The spin speed at which the data was recorded is displayed on the visual display 58.

AMPLITUDE

To test the amplitude of the signal of the data on the disc, any data track may be tested, however, unless a specific track is selected, the outer track, track zero is selected by the apparatus 1. The read head 33 is moved to the circumferential centre line of the appropriate track and only 1F signals are read. Each track being sampled is divided into six segments and the read head 33 searches for 1F signals only in each segment. Only the peak amplitude values of 1F signals above a predetermined level, in other words, the minimum level that one would normally expect a 1F signal to be at, are read and the average amplitude computed from this information over the six segments. The average amplitude values for each of the six segments are then averaged, thereby giving the average amplitude for the track. The percentage value by which track average amplitude is greater or less than The spin speed is in revolutions per minute, and the ideal value of X is the length the pulses should be. This value will have been obtained from the appropriate standard disc during calibration of the apparatus.

The spin speed at which the data was recorded is displayed on the visual display 58.

AMPLITUDE

To test the amplitude of the signal of the data on the disc, any data track may be tested, however, unless a specific track is selected, the outer track, track zero is selected by the apparatus 1. The read head 33 is moved to the circumferential centre line of the appropriate track and only 1F signals are read. Each track being sampled is divided into six segments and the read head 33 searches for 1F signals only in each segment. Only the peak amplitude values of 1F signals above a predetermined level, in other words, the minimum level that one would normally expect a 1F signal to be at, are read and the average amplitude computed from this information over the six segments. The average amplitude values for each of the six segments are then averaged, thereby giving the average amplitude for the track. The percentage value by which track average amplitude is greater or less than the reference value of track average amplitude computed from the reference standard disc during calibration is calculated and displayed. When determining the percentage difference between the track average amplitude of the disc being tested and the reference standard disc, the track average amplitude for similar tracks are compared.

ECCENTRICITY

To determine the eccentricity of a data track on the disc 4 of the floppy disc 2, the amplitude envelope of the signal on the middle track is analysed. With the disc rotating, the read head 33 is moved to the middle data track to a position where it is over the average centre line of the track. The track is then read and the amplitude envelope is recorded, see FIG. 11 (a). A typical curve of an eccentric track is illustrated by the curve 1a of FIG. 11 (a). The track average amplitude at this position is calculated. The head 33 is then moved inwardly towards the inner edge 20 of the track for a distance equivalent to half a head width. This is half the width of the read head which is a known value standard for different types of disc. The amplitude envelope beneath the head position is read and recorded. A typical amplitude envelope in this position is illustrated by the curve 1b of FIG. 11(b). The head 33 is then moved a full head width outwardly towards the outer edge 19 of the track and the amplitude envelope at that position is also read and recorded. A typical envelope at this position is illustrated by the curve 1c of FIG. 11(c).

The apparatus 1 then subtracts the curve 1c from the curve 1b to remove modulation caused by any other source besides eccentricity. The resultant curve is illustrated in FIG. 11(d) by the curve 1d. This curve 1d gives the maximum and minimum values of modulation, namely points 21 and 41 respectively on the curve 1d of FIG. 11(d).

The eccentricity of the track is determined from the following formula:

Eccentricity is equal to $$\frac{(M1 - M2)}{4A} \times W$$

where M1 is the maximum modulation resulting from eccentricity only, point 21 on curve 1d, M2 is the minimum modulation resulting from eccentricity only, point 41 on the curve 1d, A is the track average amplitude determined over the average centre line of the track, and W is the width of the read head.

MODULATION

The signal modulation is obtained by only using signals of similar type, in other words, all 1F signals or all 2F signals, this is similar to the amplitude test already described. The read head 33 is moved to the centre track of the disc and is set over the centre line of the track. The track average amplitude at the centre line of the track is computed taking only 1F signals in this case. The maximum and minimum values of amplitude at the track centre line are also read and recorded for 1F signals. The modulation is obtained from the following formula modulation equals $$\frac{A1 - A2}{2A}$$

where A1 is the maximum amplitude of 1F signals, A2 is the minimum amplitude of 1F signals, and A is the track average amplitude at the centre line of the track.

WINDOW MARGIN

Figure 15A:
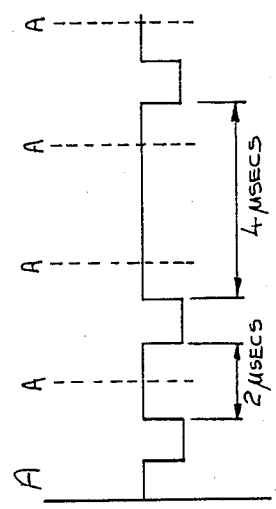
Figure 15B:
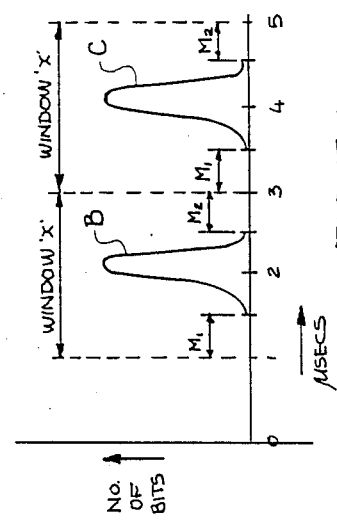

Windows are assigned on the track one for each bit of data. FIG. 15(a) illustrates bits written on a track within windows which are indicated by the vertical lines A. To determine the window margin of bits on a track the time position of each bit is read and their position relative to their window is recorded. The software of the apparatus 1 makes a plot of the distribution of the position of the bits of data relative to their window. Such plotting techniques will be well known to those skilled in the art. This plot is illustrated in FIG. 15(b). The distance M1 and M2 are the distances between the two bits of information nearest to the edges of the window.

In this case the correct distance between the 1F and 2F signals is two micro seconds and 4 micro seconds respectively. Any divergence from this will be read and recorded thus enabling the plot of FIG. 15(b) to be made. The two micro second pulses are plotted in the curve B around the two micro second position on the horizontal axis of FIG. 15(b) while the four micro second pulses are plotted in the curve C around the four micro second position of the horizontal axis of FIG. 15(b).

Needless to say, where other formats of disc are used appropriate plots are made. This is achieved by software alterations or providing additional software. This will be well understood by those skilled in the art.

The window margin is given as a percentage and the window margin percentage is therefore given by the following formula:

Window margin % equals $$\frac{(M1 + M2)}{x} \times 100$$

wherein X is the width of the window.

To determine the misalignment of a read/write head in disc drive apparatus for writing data onto a magnetic disc, a magnetic disc on which data has been written from the disc drive apparatus is placed in the receiving area 6 of the apparatus 1. The track alignment test already described is carried out on the floppy disc. If the track is misaligned, the amount of misalignment is determined, and displayed on the visual display unit. This would be similar to the misalignment of the write head in the disc drive apparatus. Similarly, where it is desired to determine the index to data offset in disc drive apparatus, the spin speed at which the data is written on the disc, the amplitude at which the data is written on the disc, the eccentricity of the drive of the disc drive unit, a floppy disc which has data written thereon by the disc drive apparatus is similarly placed in the disc receiving area of the apparatus 1 and the appropriate tests are carried out on the floppy disc. Any imperfections in the floppy disc will merely reflect the imperfections in the disc drive apparatus. Accordingly, by knowing the imperfections in the floppy disc, the imperfections in the disc drive apparatus can be immediately determined. This is particularly advantageous when one wishes to test disc drive writing apparatus used for mass production of floppy discs. By merely testing the disc produced by the disc drive apparatus, an accurate profile of the various characteristics of the apparatus can be determined. Thus, this information on the disc drive apparatus can be obtained without the need for disassembling the apparatus.

Where any characteristic of disc drive apparatus is found outside the acceptable limits, the apparatus can be taken out of production and repaired. After having been repaired, the disc drive apparatus can then be tested by carrying out the tests used in the method and apparatus according to the invention on a floppy disc which has been written on by repaired disc drive apparatus.

It will be appreciated that while in the embodiment of the invention described a curved fitting technique is used to determine the alignment of the track on the disc, other methods of determining the peak value of the transverse envelope of data signal on the track could be used, for example, it is envisaged that in certain cases the radial positions of points of similar amplitude values on each side of the peak of the transverse envelope curve could be determined to obtain an approximation of the radial position of the peak value of the transverse envelope, and the approximations could then be averaged to give the radial position of the peak.

In all cases, it will be appreciated that while the various characteristics have been determined by taking readings in certain specific tracks, the characteristics could be determined from any desired track. Indeed in certain cases, the characteristics could be determined from a number of tracks.

Further, it will be appreciated that many other tests besides those described may be carried out on the apparatus.

While particular methods have been described for measuring the various characteristics, any other suitable methods could be used without departing from the scope of the invention. Further, it will be appreciated that other characteristics besides those described could be measured without departing from the scope of the invention.

Needless to say, changes may be made to the apparatus described without departing from the scope of the invention. For example, it is envisaged in certain cases that other incremental drive means may be provided for incrementally driving the read head. Additionally, other monitoring means for monitoring the position of the read head could be used besides a diadur grating.

While in the embodiment of the invention just described, when determining the eccentricity, an inner and outer reading on the track were taken at half a head width from the average centre line, it is envisaged in certain cases that the readings on the inner and outer side could be taken at any other positions. In fact, it is believed that adequate results could be achieved by taking readings from the track at positions between 10% and 80% of the head width on either side of the average centre line.

While the apparatus has been described for testing characteristics from a floppy disc, it could equally well be used for testing characteristics on a hard disc or indeed any other magnetic disc.

While the apparatus has been described as comprising a hopper for storing and automatically feeding discs and also having ejection means, these, if desired, may be dispensed with altogether and the apparatus may be manually fed with floppy discs which would similarly be manually retrievable from the apparatus.

While in the method of determining the index to data value the read head has been moved from one track to its adjacent track from the outer track to the inner track, this is not necessary. It is not necessary that the head should be moved sequentially from one track to the next. In certain cases tracks could be skipped, or randomly selected or in other cases the first track selected may be the inner track or maybe a randomly selected track.

Further, where the apparatus and method are used from determining the index to data position of hard discs or the like, the software will determine index marks and positioning arrangement on such discs.

Further, in the method for determining amplitude and signal modulation only 1F signals were used, if desired 2F signals may be used.

I claim:

1. A method for testing alignment of a data track written on a magnetic disc, the method comprising the steps of:
    rotating the disc,
    positioning a reading means at a first known radial position relative to the centre of the disc over the data track,
    reading the signal of the track over at least portion of the circumferential length of the track at the first known radial position, and determining the track average amplitude of the signal over the read circumferential length of the known radial position,
    moving the reading means respective incremental distances transverse of the track to second and subsequent known radial positions, relative to the centre of the disc,
    reading the signal of the track at each of the known radial positions and determining the track average amplitude of the signal at the said known radial positions,
    continuing to move the reading means incremental distances transverse of the track until the value of the track average amplitude of the signal obtained from a reading is less than the track average amplitude of the signal of the reading for the previous position,
    obtaining the radius of the centre line of the data track by determining the radial position of the peak value of the track average amplitude of the signal from the readings taken, and
    comparing the radius of the centre line of the data track with the radius at which the centre line of the data track of a correctly aligned data track would have occurred, to determine the track alignment.

2. A method as claimed in claim 1 in which two further readings at known radial positions relative to the track are taken after the highest value of the track average amplitude of the signal is recorded.

3. A method as claimed in claim 1 in which the radial position of the peak value of the track average amplitude of the signal of the data track is determined by curve fitting using a parabolic curve fitting method.

4. A method as claimed in claim 1 in which the first known radial position is the outside edge of the track and the reading means is moved incrementally inwardly towards the inside edge of the track in incremental steps of 1/16 of the track width.

5. A method as claimed in claim 1 in which the radial offset of the peak value of the track average amplitude of the data track from an ideal position is computed by subtracting the ideal radius from the radius of the peak amplitude value of the data track and compensating for any inherent misalignment in the reading means.

6. A method as claimed in claim 1 in which the radial offset of the peak value of the track average amplitude of the signal of the data track from an ideal position is computed by subtracting the ideal radius from the radius of the peak amplitude value of the signal of the data track and compensating for any inherent misalignment in the reading means.

7. A method as claimed in claim 6 in which the predetermined limit is not greater than one hundred microseconds.

8. A method as claimed in claim 1 which further comprises testing the spin speed of the disc at which the data was written, the method comprising the steps of reading a data track to obtain the circumferential time width of a pulse signal of known type on the data track, and multiplying the width of the pulse by the rotational speed of the disc and dividing the product by the ideal width.

9. A method as claimed in claim 8 in which the circumferential width of a pulse signal is determined by locating and reading a band of at least twelve adjacent 2F signals from the data track, and obtaining the average signal width by determining the average width of the centre four 2F signals within the twelve signal band.

10. A method as claimed in claim 1 which further comprises the step of testing the average amplitude of the signal on a data track, the method comprising the steps of reading the amplitude of similar type signals over at least portion of the data track, determining the peak value of the amplitude of the said similar type signals, and determining the average amplitude of the signals.

11. A method as claimed in claim 10 in which the signals read are 1F signals.

12. A method as claimed in claim 1 which further comprises the step of testing the eccentricity of a data track on a magnetic disc, the method including the steps of:
    rotating the magnetic disc,
    positioning the reading means at a first position over the average circumferential centre line of a data track,
    determining the track average amplitude of the signal at the first position,
    moving the reading means to a second position between the average circumferential centre line and one side edge of the track, and recording the circumferential track amplitude envelope of the signal at the second position,
    moving the reading means to a third position on the other side of the average circumferential centre line a distance similar to the distance of the second position from the average circumferential centre line, and recording the circumferential track amplitude envelope of the signal at the third position, subtracting the track amplitude envelope of the signal at the third position from that of the second position to get a curve of amplitude modulation of the signal due to the eccentricity of the track, determining the maximum and minimum values of modulation from the modulation curve due to eccentricity, and subtracting the minimum value of modulation due to track eccentricity from the maximum value and multiplying the result by the radial distance between the second and third positions, and dividing the result by four times the track average amplitude of the signal at the first position.

13. A method as claimed in claim 12 in which the radial distance the reading means is moved from the average circumferential centre line of the track on each side thereof is half the effective width of the reading means.

14. A method as claimed in claim 1 which further comprises testing the signal modulation of the disc, the method comprising the step of reading a plurality of signals of similar type from a track at the circumferential centre line thereof, computing the track average amplitude of the signal at the centre line of the track taking only the said signals of similar type, determining the maximum and minimum amplitude values of the said signals of similar type, subtracting the minimum from the maximum values of amplitude of the signal and dividing the result by twice the track average amplitude of the signal.

15. A method as claimed in claim 1 which further comprises testing the window margin of the disc, the method comprising the step of measuring the position of a plurality of data bits on a track relative to the respective window within which they should be written, determining the position of the bits written nearest to the edges of each window, adding the two distances of the said bits to the edges of the window, and dividing the result by the width of the window.

16. A method for testing the alignment of a writing means in a disc drive apparatus for a magnetic disc, the method comprising the steps of:

testing the alignment of a data track on the magnetic disc according to the method of claim 1, and determining the alignment of the writing means in the disc drive apparatus from the results of the test on the magnetic disc.

17. Apparatus for testing alignment of a data track written on a magnetic disc, the apparatus comprising:

means for rotating the disc, reading means for reading data from the disc, means for moving the reading means radially across the disc and for selectively positioning the reading means at a plurality of radially spaced apart positions on a data track, means for recording the radius of each position from the centre of the disc, means for determining the track average amplitude of the signal of the track at each position over at least a portion of the length of a track from which data is read by the reading means, means for obtaining the radius of the centre line of the data track by determining the radial position of the peak value of the track average amplitude of the signal from the values of the track average amplitude and their positions, and means for comparing the radius of the centre line of the data track with the radius at which the centre line should have occurred in a correctly aligned track.

18. Apparatus as claimed in claim 17 in which the means for determining the radial position of the peak value of the track average amplitude from the values of the track average amplitude of the signal and their positions comprises means for using a curve fitting technique.

* * * * *